United States Patent

Young et al.

[15] 3,662,826

[45] May 16, 1972

[54] OFFSHORE DRILL STEM TESTING

[72] Inventors: David E. Young; James W. Kisling, III, both of Houston; Benjamin P. Nutter, Bellville, all of Tex.

[73] Assignee: Schlumberger Technology Corporation, New York, N.Y.

[22] Filed: June 1, 1970

[21] Appl. No.: 42,374

[52] U.S. Cl..............................166/152, 166/150, 166/226
[51] Int. Cl.........................................................E21b 49/00
[58] Field of Search ............................166/150, 152, 0.5, 226

[56] References Cited

UNITED STATES PATENTS 3,308,882  3/1967  Lebourg..............................166/150 X
3,358,755  12/1967  Chisholm............................166/152 X
3,384,180  5/1968  Perkins................................166/152 X Primary Examiner—David H. Brown
Attorney—Ernest R. Archambeau, Jr., John P. Sinnott, Stewart F. Moore, David L. Moseley, Edward M. Roney and William R. Sherman

[57] ABSTRACT

Apparatus for offshore drill stem testing from a floating vessel using a tester operated by upward and downward motion and coupled to a packer by a slip joint, the equipment being suspended in the well bore on upper and lower pipe string sections connected together by a slip joint. The tester and slip joints are balanced with respect to fluid pressure so that a sequence of free points observed on the rig weight indicator at the surface provides positive indications of operation of the tools.

11 Claims, 6 Drawing Figures

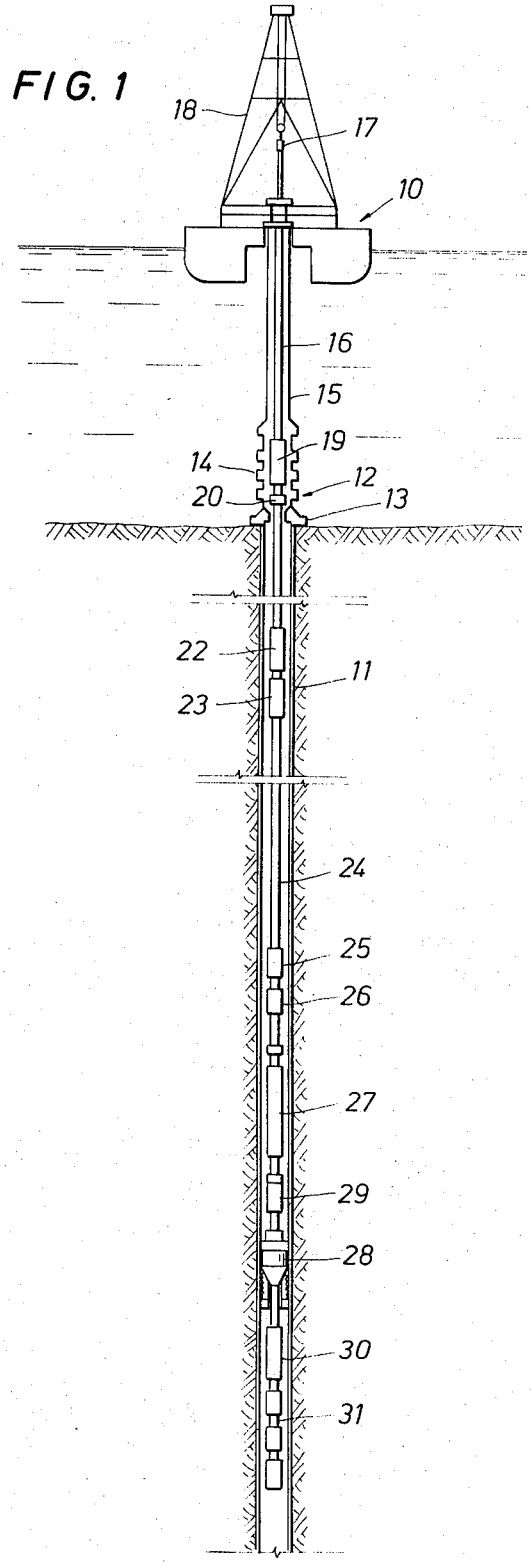
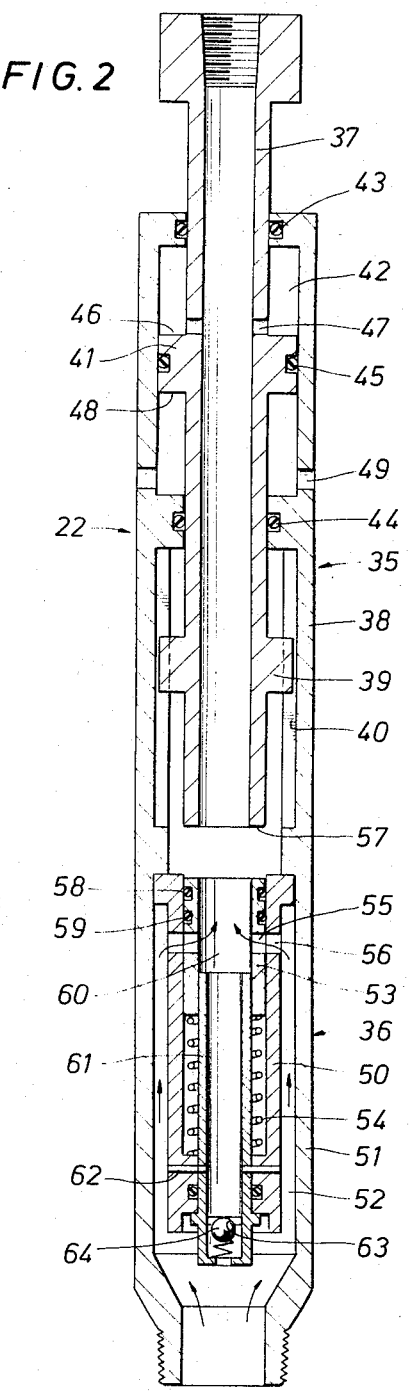
James W. Kisling III
Benjamin P. Nutter
David E. Young
INVENTORS
BY David L. Moseley
ATTORNEY

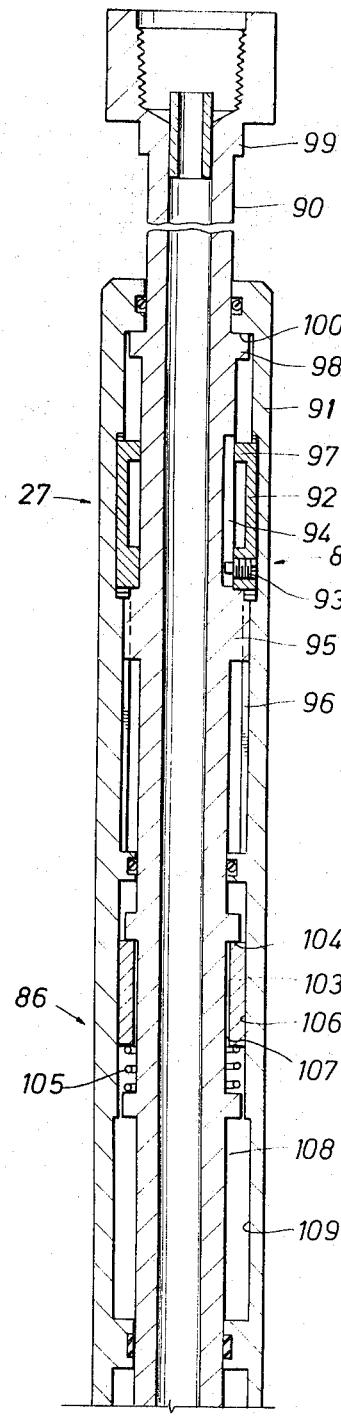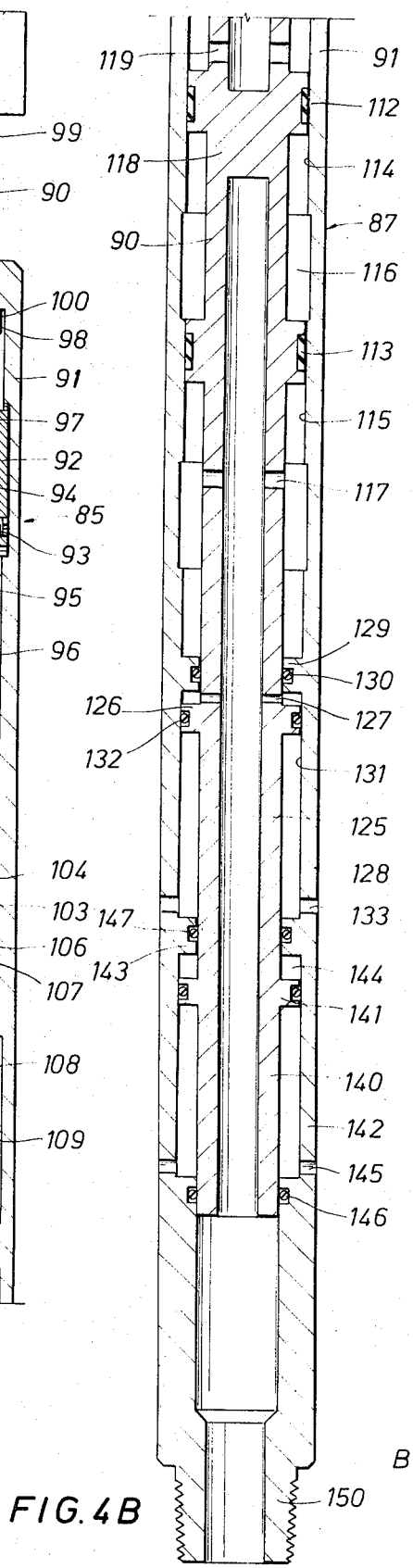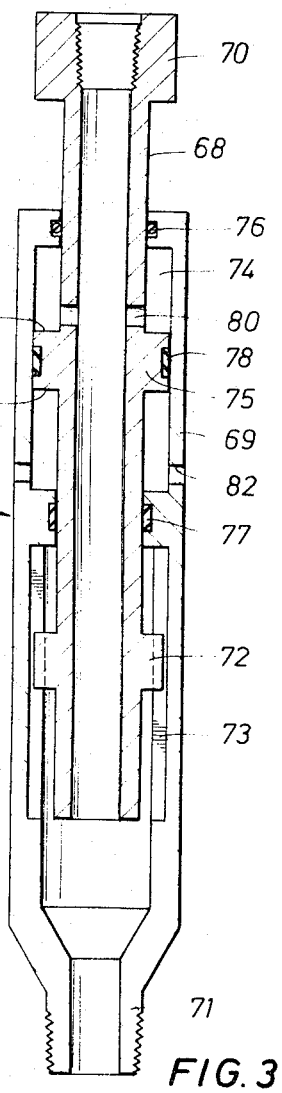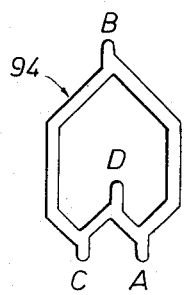

OFFSHORE DRILL STEM TESTING

This invention relates generally to formation testing methods and apparatus, and more specifically to drill stem testing tools and procedures adapted for use in testing wells from a floating vessel that is subject to wave and tide action during testing operations.

In conventional drill stem testing of land based wells, or offshore wells equipped with fixed platforms, well known procedures and tools are used to isolate the formation interval to be tested and temporarily to enable a formation intersected by the borehole to produce fluids. A packer and a tester valve are suspended in the well on a pipe string and the packer is set to isolate the interval to be tested. Then by suitable manipulation of the pipe string at the surface, the tester valve is opened and closed to obtain a sample of fluids while recorders obtain flow and shut-in pressure records from which certain valuable formation parameters can be determined.

Offshore drill stem tests performed from floating vessels, however, present a number of challenging problems requiring new approaches. The vessel under the influence of wave and tide action is continuously moving vertically with respect to the formations being tested so that pipe manipulations to operate the tools during a test may not be an easy matter. Moreover, many drill stem tests involve a repetitive sequence of test tool manipulations to obtain adequate flow and shut-in pressure measurements. Accordingly, complete and positive control by the operator is essential. It will be readily apparent that such control is made more difficult due to the above-mentioned relative motion between the vessel and the location of the tools. Also in offshore operations, safety is an overriding consideration due to the substantial risks to personnel and equipment should a blowout and fire occur, and for this reason it is generally considered to be undesirable to use tools requiring rotation because of the risks involved in rotating a pipe string that is under pressure. Moreover, test tools requiring pipe rotation for operation are not as reliable as should be desired, because the operator may be uncertain as to how many of the pipe turns at the surface have correspondingly occurred at the tools.

Accordingly, the present invention provides a string of drill stem testing equipment that is operated to initiate various phases of a test by raising and lowering the pipe string at the vessel. No rotation is required. In addition to being a safe system to operate, the requirement of only up and down motion makes possible the observation at the surface of data that will confirm that a predictable sequence of test periods or phases is in fact occuring at the formations. Relative longitudinal movement between parts of the test equipment can be detected at the surface by observing what are known as "free points" on the rig weight indicator. A free point as used herein means a weight value or weight indicator reading that remains constant while the pipe is being lifted or lowered at the surface. The fact that the value remains constant means that a length of the pipe string corresponding to that weight value is hanging freely in the well bore, and such a free point will be detected whenever there is relative longitudinal movement between a tool part that is supported in the well bore and another tool part that is suspended by the pipe string. The occurrence of free points generally can be predicted in advance and should remain constant during various phases of a test provided that the formation testing tools and other sliding joints in the string of tools are arranged to be independent of applied fluid pressures.

In further accordance with the present invention, all sliding joints are balanced with respect to applied fluid pressure, which means that such joints are constructed and arranged with transversely oriented surfaces subjected to fluid pressure in such a manner that applied pressures do not tend to either extend or close such joints. Thus it will be appreciated that the various weight values that are observed on the weight indicator at the surface during a test remain substantially constant regardless of the pressure changes that occur during a test. Since the test tools are operated by longitudinal movement between parts, the observance of various free points at the surface provides positive indications of operation of the test tools.

An object of the present invention is to provide a new and improved offshore testing system that utilizes vertical motion of the drill pipe to operate tools that are independent of applied fluid pressures so that data which is physically observable at the surface provides positive indications and assurance of operation of the tools.

Another object of the present invention is to provide a new and improved drill stem testing system that includes a tester valve that can be operated by vertical pipe motion without rotation and which is arranged to be independent of applied pressures so that predictable free points observeable on the rig weight indicator at the surface are used to confirm operation of the tools.

Yet another object of the present invention is to provide a new and improved drill stem testing system that includes a test valve that is operated by vertical motion of a pipe string, the tester being balanced so that the pipe string has a constant free point regardless of fluid pressure variations, and further including a bias means that responds to the hydrostatic head of fluids in the well to apply upward force on the tester mandrel to assist in extension of the mandrel.

Still another object of the present invention is to provide a new and improved drill stem testing system that includes a pressure balanced tester that is opened and closed by telescoping movement of a mandrel within a housing, the mandrel and housing enclosing an atmospheric chamber above an annular piston so that hydrostatic pressure assists in extending the mandrel, together with a slip joint having a significant travel length connecting the tester to a well packer so that the free point for the joint is easily observed at the surface and the tester can be operated without disturbing the packer.

These and other objects of the present invention are attained through the provision and use of a drill stem testing system comprising a major pipe string that extends from the floating vessel into the well bore and is adapted to be suspended from a fixed point at the ocean floor. The major pipe string is connected by a slip joint to a minor pipe string such as a length of drill collars having a known weight. The lower end of the minor string is coupled to the center mandrel of a tester assembly having a test valve that is opened and closed by upward and downward motion of the mandrel within an outer housing. The major and minor strings are used to raise the mandrel, whereas the weight of the minor string is used to force the mandrel downwardly within the housing.

The mandrel and housing are provided respectively with piston and cylinder means with the upper face of the piston being subject to the pressure of fluids in the inner mandrel while the lower face of the piston is subject to the pressure of fluids in the surrounding well annulus. The transverse area of the piston is sized to be equal to the transverse area bounded by the outer peripheral surface of the mandrel in order to provide the balancing feature discussed above. A second piston and cylinder combination is also provided with only the lower face of the piston being subject to the hydrostatic head of fluids in the annulus, so that when the mandrel is forced downwardly the pressure acting on said lower face provides an upward force on the mandrel to assist in subsequently moving it upwardly. This force, called the bias force, insures that the mandrel will return to its upper position during a sequence of operations in the absence of pipe weight, and independently of the movement of other telescoping joints in the system.

The tester assembly including the pressure balance and bias is coupled to a well packer by a slip joint whose operation can be readily detected at the surface by the observance of a lengthy "free point" on the rig weight indicator. The well packer can be any suitable type, but preferably has a weight set packing element and an integral fluid bypass to equalize pressure when it is desired to terminate the test and retrieve the string of tools to the surface. A suitable anchor, such as slips and an expander, or a tail-pipe is used to properly locate the packer in the borehole at a predetermined point above the interval to be tested, and of course pressure recorders are provided to obtain a permanent record of the pressure changes that occur during the test.

The tester is operated by lifting and lowering the major and minor pipe strings, and indications of the operation of the tester are observable at the surface by monitoring the free points. As the major string is lifted, for example, the first free point indication will show extension of the slip joint between the strings and a second free point may be detected as the tester mandrel elevates to operate the valve. In any event, the free point observed as the lower slip joint extends provides the operator with a well defined signal to release the brake and lower the pipe strings. Even though a free point for the tester is not detected, the existence of the bias force as previously described insures that the tester has extended before the free point of the lower slip joint is observed. As the pipe strings are lowered, a reverse sequence of free points will be seen. The lengths of the various components of the tool and pipe strings are spaced out such that when the major pipe string is suspended at the fixed point in the well bore, both slip joints are collapsed and the weight of the minor string is imposed on the tester to cause the mandrel to travel downwardly. A repetitive sequence of such operation can be initiated to perform the drill stem test with an optimum amount of safety and control.

The present invention has other objects and advantages that will become more clearly apparent in connection with the following detailed description on a preferred embodiment shown in the accompanying drawings in which:

FIG. 1 is a somewhat schematic view of an offshore well having a string of testing equipment in accordance with this invention suspended therein from a floating vessel;

FIG. 2 is a longitudinal sectional view of a slip joint and safety valve combination tool included in the string of tools shown in FIG. 1;

FIG. 3 is a longitudinal sectional view of one of the slip joints used to provide free point indications at the surface;

FIGS. 4A and 4B are longitudinal sectional views of the tester valve assembly that is operated by up and down motion of the pipe string to alternately flow and shut-in the formation; and FIG. 4C is a plan view of the channel and index system used in the tester to control the operating sequence thereof.

Referring initially to FIG. 1, a floating drilling vessel 10 is stationed over an offshore well 11 which transverses earth formations to be tested. The well can be cased or open hole but is usually cased. An underwater wellhead assembly 12 is located on the ocean floor at the top of the well bore and is constituted by the usual casing head 13 and a blowout preventor stack 14. A riser 15 normally extends from the wellhead assembly 12 upwardly to the vessel 10. A pipe string 16 is coupled to the elevators 17 in the derrick 18 and extends downward through the riser 15 and the wellhead assembly 12 and into the well bore. A control valve assembly 19 of the type shown at page 3730 of the 1968-69 Composite Catalog of Oil Field Equipment and Services, can be connected in the pipe string 16, the valve assembly having hanger surfaces 20 which can be landed against a seat so that the pipe string 16 can be suspended from the assembly 12 during a test rather than from the traveling block 17. The control valve assembly 19 contains suitable shut-off valves (not shown) which, in cooperation with the blowout preventor rams, can be closed to shut-in the well. The details of the wellhead assembly and the valve housing form no part of the present invention.

Positioned below the wellhead assembly 12 is a string of drill stem testing tools including a slip joint and a safety valve combination tool 22, an upper slip joint 23, a string of drill collars 24, reversing valves 25 and 26, a tester valve assembly 27 and a well packer 28 coupled below the tester valve by a lower slip joint 29. If desired, the combination tool 22 and the upper slip joint 23 can be separated by several sections of drill pipe. A perforated anchor pipe 30 is connected below the packer 28, and a recorder carrier 31 with conventional inside and outside pressure recorders is attached to the lower end of the perforated anchor. The packer 28 functions to pack off and isolate an interval of the well to be tested while the tester 27 is opened and closed to alternately flow and shut-in the formations. The recorders make a permanent chart of fluid pressure changes that occur during the flow and shut-in periods. Other conventional auxiliary equipment such as a jar and a safety joint can be included in the string between the packer 28 and the lower slip joint 29 as desired. The reversing valves 25 and 26 located immediately above the tester 27 are used to open the lower end of the pipe string 24 to the well annulus so that samples of fluids can be reversed out at the termination of a test according to typical procedures. Of course the well bore 11 is illustrated as being lined with a casing, however, it will be appreciated that in the event that the well is not cased, an open hole packer of the type shown in U.S. Pat. No. 2,657,751, dated Nov. 3, 1953, can be used together with a typical bypass valve.

Referring still to FIG. 1, the lower end of the pipe string 16 is connected to a safety valve and slip joint assembly 22 that functions to shut-in the pipe string therebelow in the event that due to some unfortunate occurrence, the pipe string should be broken in two below the wellhead assembly 12. This tool is provided as a safety feature and is shown in detail in FIG. 2 as including an upper slip joint section 35 and a lower valve section 36. The slip joint section 36 is formed by a mandrel 37 that is slidably and non-rotatably disposed within an outer housing 38, relative rotation being prevented by splines 39 and 40. An annular piston 41 on the mandrel 37 can reciprocate within an internal annular chamber 42 in the housing 38, the wall of the chamber providing a cylinder that is sealed with respect to the mandrel by seals 43 and 44 and with respect to the piston 41 by a seal 45. The transverse cross-sectional area of the piston 41 is sized to be equal to the area circumscribed by the outside surface of the mandrel 37 at the seal 43, and the upper face 46 of the piston is exposed to the pressure of fluids inside the mandrel by ports 47. The lower face 48 of the piston 41 is exposed to the pressure of fluids in the well annulus by ports 49. Thus arranged, the slip joint is insensitive to pressure changes that occur within the joint, because an upward force on the mandrel 37 due to greater fluid pressure inside the mandrel is balanced or cancelled by a downward force due to the same pressure acting on the upper face 46 of the piston 41.

Turning now to the valve section 36 of the assembly 22, an annular sleeve member 50 is installed within the lower portion 51 of the housing 38 with its outer periphery spaced inwardly from the inner wall of the lower portion 51 to provide an annular fluid passage space 52. A sleeve valve 53 fits slidably within the sleeve member 50 and is pressed toward an upper position by a coil spring 54. In the upper position, the valve 53 and sleeve 50 have lateral ports 55 and 56 that register with each other to provide a fluid flow path through the housing and mandrel. The sleeve valve 53 is sized to be engaged by the lower end surface 57 of the mandrel 37 and can be driven downwardly thereby to a position whereby upper and lower seals 58 and 59 span the ports 56 to block fluid communication. The through-bore 60 of the sleeve member 50 is closed by a knock-out plug or barrier assembly that includes a barrel 61 attached to the sleeve member by a shear ring 62. The barrel has a downwardly facing valve seat 63 that is normally engaged by a spring-loaded ball 64 to prevent fluid flow in an upward direction only. To remove the barrier, a go-devil or bar (not shown) is dropped through the pipe string, and upon impact with the barrel 61, causes the member 62 to shear so that the barrier can fall down the pipe string 24.

The safety valve 22 is, in turn, connected to a balanced slip joint 23 that is shown in detail in FIG. 3. The slip joint 23 has a hollow inner mandrel 68 that is telescopically disposed within an outer housing 69. The upper end of the mandrel 68 is connected by a collar 70 to the lower end of the safety valve 22, while the lower end of the housing 69 is connected by a threaded pin 71 to the pipe string 24. External splines 72 on the mandrel 68 mesh with internal spline grooves 73 in the housing 69 to prevent relative rotation. The housing 69 has an internal annular chamber 74 that slidably receives an annular piston 75 on the mandrel 68. Appropriate seals 76 and 77 seal off the chamber 74 at each end, and a seal 78 seals the piston 75 with respect to the inner wall of the chamber 69. The upper face 79 of the piston 75 is exposed to the pressure of fluids with the bore of the mandrel 68 via one or more ports 80, and the lower face 81 of the piston is exposed to the pressure of fluids in the well annulus via ports 82. The transverse area of the piston 75 (bounded by the seals 76 and 78) is made equal to the transverse area of the mandrel 68 (bounded by the seal 76). Thus arranged, the slip joint is independent of the pressure changes that occur within the mandrel and housing as previously described with reference to the slip joint and safety valve combination tool 22.

The pipe string 24 is normally composed of a number of sections of drill collars connected end-to-end. The total length of the string 24 is chosen to provide a certain amount of weight that is necessary for purposes to be described below. The lower end of the pipe string 24 can be connected to conventional reverse circulating valves 25 and 26. The upper valve 25 can be of the type having a side port closed by a plug that can be released by pressure applied to the inside of the pipe string to enable reverse circulation by pressurizing the annulus. The lower reversing valve 26 can be of the type shown in U.S. Pat. No. 2,661,802, issued Dec. 8, 1953, the valve being operated by rotation of the pipe string to open ports and enable reversing out the fluid recovery to the surface.

The lower end of the reversing valve 26 is connected to the upper end of the tester assembly 27. The tester assembly 27 shown in FIGS. 4A and 4B, is constituted by a control and indexing section 85, a delay section 86 and a test valve and sample chamber section 87. The indexing, delay and valved sample chamber sections are described generally in detail in U.S. Pat. No. 3,308,887, Nutter, dated Mar. 14, 1967, and basically include a mandrel 90 that is slidable within a housing 91 between extended and retracted relative positions. An index sleeve 92 mounted on the housing 91 is rotatable relative to both the housing 91 and the mandrel 90, and carries an index pin 93 that follows in a channel system 94 depicted in plan view in FIG. 4C. The mandrel 90 has splines 95 that ride in spline grooves 96 in the housing 91 to prevent relative rotation, so that as the mandrel is moved successively upwardly and downwardly, the swivel sleeve 92 rotates due to the interengagement of the index pin 93 within the channel system 94. The mandrel 90 has lugs 98 that can engage inward projections 97 on the sleeve 92 only in certain relative rotational positions of the sleeve with respect to the mandrel. In all other relative positions, the lugs 98 pass through the spaces between the projections 97 so that the lugs pass downwardly within the sleeve. In the running-in condition of the tester, the pin 93 is in the pocket A shown in FIG. 4A and the mandrel 90 is extended relative to the housing 91. To open the tester valve as will subsequently be described, the mandrel 90 is lowered to the limit of its downward movement within the housing 91, where the pin 93 is in the pocket B. During this relative longitudinal movement, the mandrel lugs 98 bypass the projections 97. To close the tester valve, the mandrel 90 is elevated, and again the lugs 98 bypass the projections 97 so that the mandrel moves to the upper limit of its travel. The index pin 93 occupies position C. The mandrel 90 is again lowered, but this time as the pin 93 moves to position D, the lugs 98 engage the projections 97 to limit downward movement. The valve is still closed and weight can be applied to the housing 91 and consequently to the tools therebelow. The limit of downward movement of the mandrel 90 occurs when a shoulder 99 engages the top of the housing 91, whereas the limit of upward movement is provided by engagement of the lugs 98 with a downwardly facing shoulder 100 on the housing.

The delay section 86 includes a metering sleeve 103 that is biased upwardly against a shoulder 104 on the mandrel 90 by a spring 105. The metering sleeve 103 is sized to provide a small clearance between its outside surface and the inner wall 106 of the housing 91. The sleeve 103 further has grooves 107 or the like in its inner periphery to provide fluid passage spaces. The upper end surface of the metering sleeve 103 seats against the shoulder 104 during downward movement of the mandrel 90 so that hydraulic fluid contained in a sealed chamber 108 above and below the sleeve must flow from below the sleeve to above the sleeve at a metered rate, thus providing a retarding or delaying action with respect to downward movement. However, the mandrel 90 can be moved freely upwardly because the fluid will push the sleeve 103 downwardly away from the shoulder 104 and fluid can bypass through the grooves 107 from above the sleeve to below it. The wall surface 109 at the lower section of the chamber 108 can be enlarged in diameter so that the metering action provided by the sleeve 103 is released as the mandrel 90 nears the lower end portion of its travel.

The test valve and sample chamber section 87 comprises upper and lower valve seals 112 and 113 on the mandrel 90 that engage spaced valve seats 114 and 115 when the mandrel is extended or partially contracted, and are free of the seats when the mandrel is fully telescoped within the housing 91. The annular space 116 in between the valve seats 114 and 115 provides a flow-through sample chamber, in that when the mandrel 90 is in its lowermost position, fluids can flow upwardly from ports 117 below a barrier 118 through the chamber 116 and through ports 119 above the barrier into the bore of the mandrel 90. However, when the mandrel 90 is moved upwardly the seals 112 and 113 engage the seats 114 and 115 simultaneously to trap a sample of fluids in the chamber 116. It will be appreciated that the valve is open only when the mandrel 90 is completely telescoped within the housing 91 and that when the mandrel is in the positions corresponding to positions C and D in FIG. 4C, the valve is closed to shut-in the formations.

The foregoing tester assembly structure is fully described in the aforementioned Nutter patent, and the precise details form no part of the present invention. However, the foregoing broadly in combination with the following structure is believed to be unique in the art. Referring to FIG. 4B, an extension 125 of the mandrel 90 is provided with an annular piston 126 with the upper face of the piston exposed to the pressure of fluids within the bore of the mandrel extension by ports 127. A section 128 of the housing 91 provides a cylinder with an inwardly extending flange 129 sealed against the mandrel extension 125 by a seal 130, and with the cylinder wall 131 sealed with respect to the piston 126 by a seal 132. The lower face of the piston 126 is exposed to the pressure of fluids in the annulus by ports 133. The transverse cross-sectional area of the piston 126 is made equal to the transverse area encompassed by the outer peripheral surface of the mandrel 90. Accordingly, forces due to fluid pressures below and inside the mandrel 90 tending to elevate it are balanced or cancelled by the same pressure acting downwardly on the piston 126. The purpose of this arrangement is to prevent the influence of fluid pressure changes that occur during a drill stem test from affecting the longitudinal relative positions of the mandrel 90 and the housing 91, and to eliminate changes in free point indications at the surface due to such pressure changes.

An additional extension 140 of the mandrel 90 has an annular piston 141 that is sealed within a cylinder section 142 of the housing 91 and encloses, together with an inwardly extending shoulder 143, an atmospheric chamber 144 above the piston 141. The lower face of the piston 141 is exposed to the hydrostatic head of fluids in the annulus by ports 145, and of course the upper face of the shoulder 143 is exposed to the same pressures. A seal 146 prevents fluid leakage between the lower end of the mandrel 90 and the housing 91, and a seal 147 prevents leakage into the chamber 144. The purpose of this arrangement is to provide a bias force that will assist in elevating the mandrel 90 once it has been lowered. Upon lowering, a force due to the difference between the hydrostatic pressure of well fluids in the annulus and the lesser pressure in the chamber 144 acts in an upward direction on the mandrel 90. Moreover, an identical force acts downwardly on the shoulder 143 and is transmitted by the housing 91 to the tools therebelow to aid in retaining a packer seat and the packer bypass closed. The presence of the bias force will ensure that the mandrel 90 will move upwardly during a sequence of test tool manipulations, independently of the movement of other sliding joints in the system.

The lower end of the tester housing 91 is connected by a threaded pin 150 to the inner mandrel of the lower balanced slip joint 29 of identical construction to the slip joint 23 previously described with reference to FIG. 3. The function of the lower slip joint 23 is to ensure that movements that may occur due to operation of the tester 27 do not disturb the packer 28. Moreover, the relative movement inherent in the slip joint 23 will provide a clearly evident "free point" at the surface as an indication of the operating position of the tools as will be more fully described.

The packer 28 can be any type of weight set packer having slips to anchor against movement and an internal bypass valve to equalize pressures at the end of the test. The details of such a packer are well known to those skilled in this art, and one example is shown in U.S. Pat. No. 3,399,729, McGill, issued Sept. 3, 1968. Basically, the packer comprises an inner mandrel telescopically disposed within an outer housing that carries expansible packing elements and an expander. A drag assembly having friction blocks that frictionally engage the casing is mounted on the mandrel and carries normally retracted slips. A pin on the drag assembly follows in a Jay-slot on the mandrel and functions to either lock the packer parts in running and retrieving positions, or to release the parts so that the slips can be shifted outwardly by the expander into gripping contact with the casing and the packing can be expanded into sealing contact with the casing. A sleeve that carries the packing elements is laterally spaced relative to the mandrel to provide a fluid bypass extending between locations in communication with the well bore above and below the packing elements. The bypass is closed by moving the mandrel downwardly until a valve head engages the valve seat.

In operation, the string of tools previously described are lowered into the well through the wellhead and the packer 28 is disposed at a preselected depth. The tester 27 is closed and the pipe strings 16 and 24 are either empty of fluids, or a water cushion can be placed in the string 24 above the tester. In either event, the bore of the pipe provides a low pressure region with respect to the pressure of fluids in the formation to be tested. The packer 28 is set to isolate the test zone by suitable manipulations of the pipe strings 16 and 24 and then lowering the pipe to apply weight to the packer. The slips are shifted outwardly by an expander cone and the weight of the pipe string causes compressive force to be applied to the packing elements, resulting in expansion thereof into sealing contact with the well bore wall. The landing flange 20 is properly located in the pipe string 16 and with respect to the total length of the pipe and equipment in the well bore and the relative travel of the slip joints 23 and 29 so that when the flange is landed to suspend the upper string 16 from the wellhead 12, the slip-joint associated with the combination tool 22 is in tension, but both of the compensating slip joints 23 and 29 are fully closed. As the slip joints close, the entire weight of the drill collar string 24 is imposed on the tester 27 and on the packer 28. The weight is sufficient to set the packer 28 as previously described to pack off the zone to be tested, and to force the tester mandrel 90 downwardly within the housing 91. The retarding action of the metering sleeve 103 within the tester 27 insures that the packer 28 is set and its bypass closed before the test ports 119 have an opportunity to be opened up to fluid flow.

When the tester mandrel 90 reaches the end of its downward travel (index pin 93 at point "B" in FIG. 4C), the valve seals 112 and 133 are disengaged from the valve seats 114 and 115 and the low pressure region within the pipe string 24 is communicated with the well bore zone below the packer 28. If the formations adjacent the casing perforations (not shown) can do so, they will produce fluids which will flow into the pipe string 24. The tester valve is left open for a period of time sufficient to permit a complete drawdown of pressure, then the valve is closed to permit recordal of pressure build-up data. The valve is closed by first elevating and then lowering the pipe strings 16 and 24. As the pipe is elevated, the rig weight indicator will show a first free point indication as the slip joint 23 extends, then the weight values will continue to climb. A second free point indication should be seen as the tester mandrel 90 is raised within the housing 90. In any event, an extensive free point indication will be given as the lower slip joint 29 extends. At least when this latter free point is seen, the operator can immediately release the brake and lower the pipe again. When the landing flange 20 again seats in the wellhead 12, the slip joints 23 and 29 will again be closed so that the weight of the drill collars 24 is imposed on the tools therebelow. As the mandrel 90 moves downwardly the second time, the projections 97 on the index sleeve 92 engage the lugs 98 on the mandrel 90 to stop the mandrel short of open position, corresponding to position "D" in FIG. 4C. The tester 27 is now shut-in and is left in that condition for the period of time desired to obtain a pressure build-up data. During such time, the weight of the drill collar string 24 is being applied to the tools to ensure that the packer 28 remains seated. Additional flow and shut-in periods can be undertaken as many times as desired using the sample pipe string manipulations. Each time the tester mandrel 90 is moved downwardly within the housing 91, the hydrostatic pressure of fluids in the annulus acts upwardly on the lower face of the bias piston 141 and produces an upward force on the mandrel 90 that will tend to return the mandrel to its upper position. This force ensures that when the pipe strings 16 and 24 are lifted at the vessel 10 to cycle the tester 27, upward movement of the mandrel 90 will occur before the free point of the lower compensating slip joint 29 is indicated at the surface. Thus, regardless of whether a free point is seen for the tester 27, there is positive assurance that the tester is operating properly.

Since the tester 27 and the slip joints 23 and 29 are balanced with respect to pressure changes that occur within these tools during a drill stem test, the various free points should remain substantially the same during a repetitive sequence of operations. Accordingly, the various free point values provide positive surface indications of the operation of the tools.

To terminate the test, the pipe strings 16 and 24 are lifted at the vessel 10 and the lifting continued after the operator sees the free point for the lower slip joint 29. As the mandrel of the packer 28 is pulled upwardly, the bypass is opened so that fluid pressures on opposite sides of the packer are equalized. As the end-wise compressive force is relieved from the packing elements they will inherently retract. The slips are moved away from the casing wall, and the entire string of tools can be retrieved to the surface.

In the event that the pipe string 16 should be severed for some reason below the wellhead assembly 12, the lower part of the broken pipe will drop and cause the slip joint section 35 of the tool 22 to close. As the mandrel 37 telescopes completely within the housing 38, the lower end of the mandrel engages the valve sleeve 53 and pushes it downwardly into spanning relation with the ports 56. The valve sleeve 53 together with the upwardly closing check valve 64 function to shut-in the pipe strings and kill the well.

Since certain modifications or changes may be made in the disclosed embodiment of the present invention without departing from the inventive concepts involved, it is the aim of the appended claims to cover all such modifications and changes falling within the true spirit and scope of the present invention.

We claim:

1. A drill stem testing apparatus comprising: tester means including a mandrel movable upwardly and downwardly within a housing, said tester means having valve means operated in response to upward and downward movement for opening and closing a fluid passageway through said housing and said mandrel;

first piston and cylinder means coupled respectively to said mandrel and said housing with the upper face of said piston being subject to the pressure of fluids in said passageway and the lower face thereof being subject to the pressure of fluids in the well annulus;

second piston and cylinder means coupled respectively to said mandrel and said housing and enclosing a low pressure chamber above said piston means, the lower face of said piston means being subject to the pressure of fluids in the well annulus to provide an upwardly directed bias force tending to cause upward movement of said mandrel;

packer means for isolating a formation interval to be tested; and slip joint means for connecting said housing to said packer means so that said mandrel and said housing can be moved longitudinally in the well bore with respect to said packer means.

2. The drill stem testing apparatus of claim 1 wherein said slip joint means includes a mandrel telescopically disposed within a housing, said mandrel and housing respectively having third piston and cylinder means with the upper face of said third piston means being subject to the pressure of fluids within said mandrel and the lower face thereof being subject to the pressure of fluids in the well annulus.

3. The drill stem testing apparatus of claim 1 further including seal means for preventing fluid leakage between said mandrel and said housing, the transverse cross-sectional area of said first piston means being substantially equal to the transverse area circumscribed by said seal means, so that the pressure of fluids within said mandrel acts with equal force in opposite longitudinal directions thereon.

4. The apparatus of claim 1 wherein said valve means includes longitudinally spaced valve elements on said mandrel, said tester means further including an annular sample chamber between said mandrel and said housing, said valve elements closing the upper and lower ends of said sample chamber to trap a sample of formation fluids.

5. A drill stem testing apparatus comprising:

tester means including a mandrel movable upwardly and downwardly within a housing, said tester means having valve means operated in response to upward and downward movement for opening and closing a fluid passageway through said housing and said mandrel;

first piston means on said mandrel sealingly slidable within first cylinder means on said housing;

ports through the wall of said mandrel above said piston means and through the wall of said cylinder means below said piston means to subject the upper face of said piston means to the pressure of fluids within said mandrel and the lower face thereof to the pressure of fluids in the well annulus surrounding said housing;

second piston means on said mandrel sealingly slidable within second cylinder means on said housing, said second piston and cylinder means enclosing a low pressure chamber above said second piston means;

a port through the wall of said second cylinder means below said second piston means to subject the lower face thereof to the pressure of fluids in the well annulus surrounding said housing;

packer means for isolating a formation interval to be tested; and a connection including longitudinally slidable parts for coupling said housing to said packer so that said tester can be moved longitudinally in the well bore to a limited extent with respect to said packer means.

6. The drill stem testing apparatus of claim 5 further including seal means for preventing fluid leakage between said mandrel and said housing, the transverse cross-sectional area of said first piston means being substantially equal to the transverse area circumscribed by said seal means.

7. The drill stem testing apparatus of claim 6 wherein said longitudinally slidable parts are constituted by a mandrel telescopically disposed within a housing, said last-mentioned mandrel and housing respectively having third piston and cylinder means with the upper face of said third piston means being subject to the pressure of fluids within said mandrel and the lower face thereof being subject to the pressure of fluids in the well annulus.

8. The drill stem testing apparatus of claim 7 wherein said third piston means is sized with respect to said mandrel so that vertically directed forces on said mandrel due to fluid pressure within said mandrel are balanced.

9. A drill stem testing apparatus for use in offshore testing from a floating vessel, comprising: a first string of pipe extending from the vessel into the well bore;

a second string of pipe having a predetermined weight;

first slip joint means including concentrically disposed members that are freely slidable relative to one another between longitudinally spaced positions for connecting the lower end of said first string to the upper end of said second string;

tester means including a mandrel coupled to the lower end of said second string and movable upwardly and downwardly within a housing, said tester means having valve means operated in response to said upward and downward movement for closing and opening a fluid passageway through said housing and mandrel;

piston and cylinder means operatively associated with said tester means and adapted to balance out and cancel the effect on said tester means of fluid pressure changes inside said tester means during a drill stem test;

packer means for isolating a formation interval to be tested;

and second slip joint means including concentrically disposed members that are freely slidable relative to one another between longitudinally spaced positions for connecting said tester means to said packer;

said mandrel being moved upwardly by lifting said first and second pipe strings jointly, said mandrel being forced downwardly by lowering said first string to close said first slip joint means, so that the weight of said second string is applied to said mandrel;

said second slip joint means isolating said packer means from the lifting forces applied to said tester means.

10. The testing apparatus of claim 9 further including bias means responsive to the hydrostatic head of fluids in the well bore for applying a lifting force to said mandrel when said mandrel is moved downwardly with respect to said housing.

11. The testing apparatus of claim 9 wherein said first and second slip joints each include piston and cylinder means for cancelling the effect thereon of changes in fluid pressures within said pipe strings.

* * * * *